United States Patent [19]

Tsunoda et al.

[11] Patent Number: 4,734,871
[45] Date of Patent: Mar. 29, 1988

[54] WIRELESS BATTERY POWERED TEMPERATURE REMOTE CONTROLLER

[75] Inventors: Hideo Tsunoda, Numazu; Harunobu Nukushina, Fuji, both of Japan

[73] Assignee: Kabushiki Kaisha Toshiba, Kawasaki, Japan

[21] Appl. No.: 771,805

[22] Filed: Sep. 3, 1985

[30] Foreign Application Priority Data

Aug. 31, 1984 [JP] Japan ................................ 59-180284

[51] Int. Cl.$^4$ ........................ G05D 23/00; F24F 11/00
[52] U.S. Cl. .................................. 364/557; 236/46 F; 236/51; 165/12
[58] Field of Search ............. 236/46 R, 46 F, DIG. 8, 236/DIG. 14, 51, 91 C; 340/309.15, 696, 825.69; 364/200, 505, 557, 569, 707, 900; 455/603

[56] References Cited

U.S. PATENT DOCUMENTS

| | | | |
|---|---|---|---|
| 4,114,447 | 9/1978 | Creach | 364/557 |
| 4,125,871 | 11/1978 | Martin | 364/900 |
| 4,203,153 | 5/1980 | Boyd | 364/200 |
| 4,279,020 | 7/1981 | Christian et al. | 364/900 |
| 4,391,913 | 7/1983 | Keldman | 236/36 |
| 4,433,719 | 2/1984 | Cherry et al. | 165/26 |
| 4,471,352 | 9/1984 | Soulliard et al. | |
| 4,544,923 | 10/1985 | Blatter et al. | 340/825.69 |
| 4,544,924 | 10/1985 | Blatter et al. | 340/825.69 |

FOREIGN PATENT DOCUMENTS

| | | | |
|---|---|---|---|
| 0026612 | 4/1981 | European Pat. Off. | |
| 84282 | 7/1979 | Japan . | |
| 55-13580 | 1/1980 | Japan | 455/603 |
| 55-51251 | 4/1980 | Japan | 236/51 |
| 57-26338 | 2/1982 | Japan | 236/51 |
| 59-71943 | 4/1984 | Japan | 236/51 |
| 59-95328 | 6/1984 | Japan | 236/46 F |
| 60-2835 | 1/1985 | Japan | 236/51 |
| 2050001 | 12/1980 | United Kingdom . | |
| 2051421 | 1/1981 | United Kingdom . | |

OTHER PUBLICATIONS

U.K. Patent Application GB2068596, 8/12/81 (published) Smith & Norvall Inventors.

Primary Examiner—Errol A. Krass
Assistant Examiner—Steven A. Melnick
Attorney, Agent, or Firm—Cushman, Darby & Cushman

[57] ABSTRACT

A temperature control apparatus for a heating or cooling apparatus with a temperature sensor, a computer producing a control signal in response to temperature during an operation period and thereafter entering a halt period, a transmitter for sending the control signal to the heating or cooling apparatus and a timer for controlling the computer. The timer is activated by commencement of the operation period to reactivate the computer after a predetermined time.

5 Claims, 5 Drawing Figures

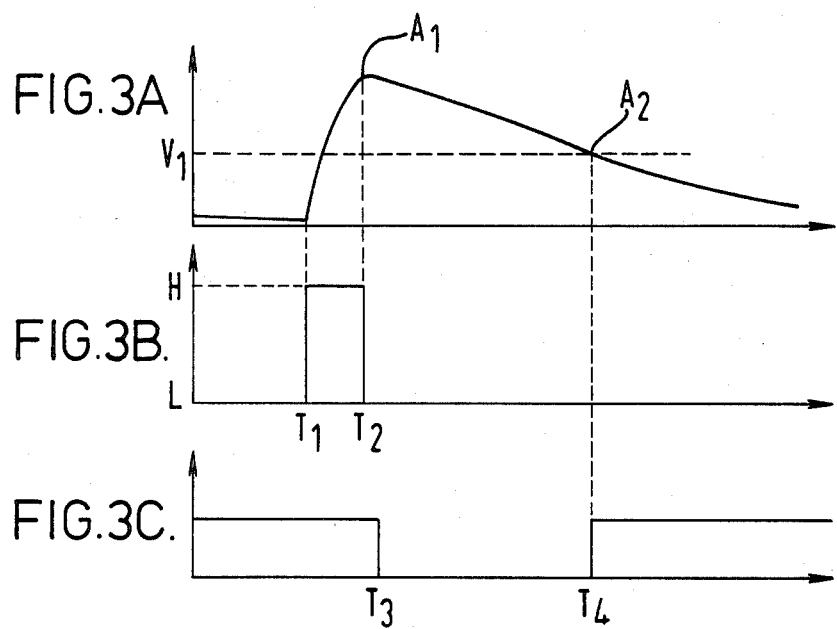

WIRELESS BATTERY POWERED TEMPERATURE REMOTE CONTROLLER

BACKGROUND OF THE INVENTION

The present invention relates to a temperature control apparatus for a heating and/or cooling apparatus, in particular, to a wireless remote control apparatus using a battery as a power supply, and its operating method.

Wireless type remote control apparatus are now used for controlling apparatus such as air conditioners. Conventionally this control apparatus uses a battery as a power source. Since it is troublesome to frequently change batteries, small power consumption is required of this type of control apparatus.

One known apparatus of this type includes a temperature sensing circuit detecting temperature in a room, a comparing circuit comparing the detected temperature with a desired temperature and producing a signal, a transmitting circuit sending the signal to the apparatus to be controlled, such as an air conditioner, and a timer. The timer enables the remote control apparatus to detect the temperature and to send a regular signal intermittently. This apparatus has relatively low power consumption, but further reduction is desirable. Because the timer is operated irrespective of operation of the circuits described above, it takes longer than necessary to completely carry out the circuit operations. In other words, in spite of completion of the operations, the circuits are still supplied with useless power by the timer.

SUMMARY OF THE INVENTION

The present invention includes a microcomputer having a CPU (central processing unit), ROM (read only memory) and RAM (random access memory), and a timer circuit, such as e.g. a C-R timer, for determining the halt period of time of the CPU, the charging of which is commenced by an output signal (a high level signal) of the CPU. The CPU produces an output signal (a low level signal) and enters its halt state by itself when the timer circuit is charged up. Thus the CPU stays in its halt state while the timer discharges to a prescribed voltage level resulting in small power consumption.

It is an object of the present invention to provide an improved wireless type remote control apparatus achieving small power consumption.

It is another object of the invention to provide an unique operating method of a wireless type remote control apparatus.

BRIEF DESCRIPTION OF THE DRAWINGS

Other objects and advantages of the present invention will be apparent from the following detailed description of the presently preferred embodiment taken in conjunction with the accompanying drawings, in which:

FIGS. 3A, 3B and 3C show time charts showing the voltage at point A in the circuit diagram of FIG. 2, the output of the CPU output port 38 and the operation and halt period of the CPU.

DETAILED DESCRIPTION OF THE PREFERRED EMBODIMENT

An embodiment of the present invention will now be described in more detail with reference to the accompanying drawings.

Figure 1:
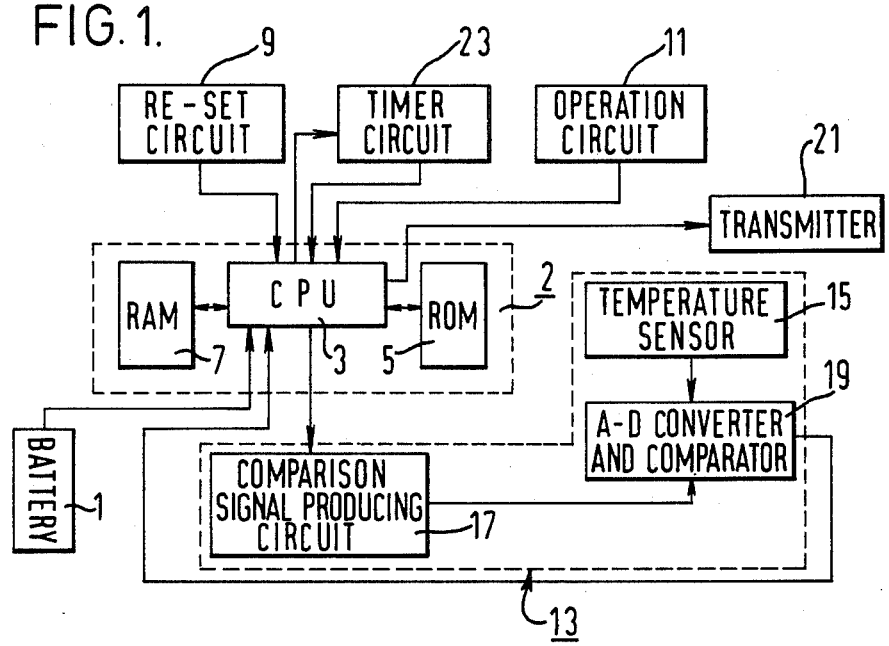
FIG. 1 shows a block diagram of an embodiment of a wireless remote control apparatus used for an air conditioner according to the present invention.

Referring to FIG. 1, the wireless remote control apparatus includes a battery 1 as a power source, a microcomputer 2 composed of CPU 3, ROM 5 and RAM 7, a re-set circuit 9 for providing a re-set signal to a re-set terminal of the CPU prior to the commencement of operation of the microcomputer 2, and an operation circuit 11 for presetting and controlling a desired temperature in a room. This operation circuit controls a temperature set point. The operation circuit 11 is also provided with an on and off switch for controlling the air conditioner. A temperature sensing circuit 13 includes a temperature sensor 15 for sensing the temperature in the room and producing a room temperature signal (an analog value corresponding to the sensed temperature), a comparison signal producing circuit 17 for producing a comparison signal in response to an output of the CPU, and an A-D converter circuit 19 which also compares the room temperature signal with the comparison signal to produce a comparison result signal (a digital signal). A transmitter 21 sends a control signal from the CPU to the apparatus to be controlled, modulated with light or sound waves, in accordance with the comparison result signal.

Operation of the above-described circuits will be described hereinafter. The CPU sends its output sequentially to the comparison signal producing circuit 17, and causes it to produce the comparison signal which is a progressive step function voltage which is supplied to comparison circuit 19 as a reference. The comparison signal and the room temperature signal, corresponding to the detected temperature fed from the temperature sensor 15, are compared using the A-D converter and comparator circuit 19. As a result, circuit 19 produces the comparison result signal. When the output (the comparison result signal) of the A-D converter and comparator 19 changes from L (a low level potential) to H (a high level potential) or from H to L, the CPU detects the temperature at that time. The detection is based on the output from the CPU to the comparison signal producing circuit 17. Then, the CPU uses either the detected temperature itself or, for example the difference between the detected temperature and a desired temperature to produce a control signal and sends the control signal to the transmitter 21. The transmitter 21 receives the control signal from the CPU, and sends it modulated with either light or sound waves to a receiver in the air conditioner (not shown). Operations of the air conditioner are then carried out according to the control signal. A construction of a timer circuit 23 and the CPU which are characteristic of the present invention will now be described.

The wireless type remote control apparatus further includes timer circuit 23, such as e.g., a C-R timer, for determining the halt period of time of the CPU, which is controlled of by a direct halt signal (a high level potential) fed from the CPU. The CPU produces a timed halt signal (a low level potential) and enters the halt state by itself when the timer circuit 23 is charged up.

Figure 2:
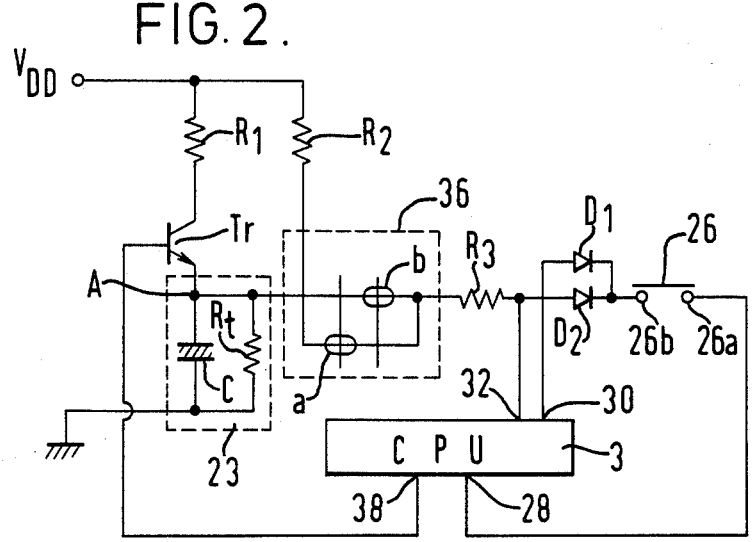
FIG. 2 shows a circuit diagram of a timer circuit of FIG. 1.

FIG. 2 shows a circuit diagram of a C-R timer as an example of a suitable timer circuit and CPU. A switch 26 in the operation circuit 11 is an on and off switch.

One end 26a of the switch 26 is connected to an output port 28 of the CPU, while the other end 26b is connected to an output port 30 of the CPU through a backward connected diode $D_1$, and is connected to an operation halt port 32 through a backward connected diode $D_2$. A power supply voltage $V_{DD}$ is connected to the emitter of a NPN transistor Tr through a resistor $R_1$, and is also connected through a resistor $R_2$ to a contact a of a switch 36 for selecting a temperature sensing mode.

The base of transistor Tr is connected to an output port 38 of the CPU, and the emitter is grounded through the C-R timer 23. The C-R timer 23 is formed with a parallel connected circuit of a resistor Rt and a capacitor C. A connecting point A between the emitter of the transistor Tr and the C-R timer 23 is connected to the operation-halt port 32 through a contact b of switch 36 and a resistor $R_3$. The switch 36 enables the user to select the temperature sensing position (at the remote control device or at the apparatus side to be controlled.

When switch 36 is at the contact a, temperature sensing is carried out at the air conditioner side. The CPU operates only when the on and off switch 26 is operated and then shifts to the halt state after sending a signal (on or off signal) once.

When the switch 36 is at the contact b, temperature sensing is executed at the remote control device side. A detailed operation will be described as follows.

When on and off switch 26 is closed, an L output (a low level potential) of the output port 28 is applied to the operation-halt port 32 through the diode $D_2$. The CPU 3 responds to the change from H (a high level potential) to L of the operation halt port 32 and begins operation. When the CPU starts operation, the comparison signal producing circuit 17 and the A-D converter 19 operate and the room temperature signal (the sensed temperature) produced by the sensor 15 is converted to the comparison signal (a digital signal) and applied to CPU 3. At this time, if a transmit command is in the CPU, this command is carried out by the transmitter 21. The conditions producing the transmit command are as follows:

(1) When the difference between the latest temperature and the prior temperature is greater than a prescribed constant value;
(2) When a predetermined period of time passes after the prior temperature data has been transmitted; or
(3) When the on and off switch is operated.

Once a temperature detecting cycle is completed, the CPU outputs a charge command signal as a high level potential from output port 38 (time T1 as shown in FIG. 3B). This charge command signal is coupled to the base of transistor Tr. With transistor Tr on, capacitor C is charged through resistor R1, building up the charge of capacitor C. The charge of capacitor C with respect to time can be seen in FIG. 3A. This voltage gradually rises until it reaches a prescribed level A1 in FIG. 3A. During this charging operation, CPU 3 still operates, as shown in FIG. 3C. The voltage potential of point A shown in FIG. 2 is applied to the operation/halt port 32 of the CPU. If the voltage potential of point A is under the standard voltage V1, as shown in FIG. 3A, the CPU recognizes this voltage potential as "L". On the other hand, the voltage potential thereof is above V1, a "H" is recognized. During the charging of capacitor C, when the voltage potential of point A is lowered to V1, this potential will be recognized as a "H" by the CPU. However, the operation state of the CPU is still maintained. Only when the "L" level of the voltage potential of point A is recognized during the halt state of the CPU, will the CPU change its state from the halt state to the operation state. When the voltage potential of point A has reached the prescribed level $A_1$, the charge command signal from the CPU becomes low (time T2 in FIG. 3B). After that, CPU 3 automatically enters a halt state at time T3 shown in FIG. 3C. At the same time, since the charge command signal having a low level is sent to the base of transistor Tr, transistor Tr is turned off. Therefore, the charging of capacitor C will terminate, and the C-R timer 23 will discharge through its internal resistance Rt. This will cause the voltagen potential of point A to gradually decrease, as shown in FIG. 3A. During this time, however, the CPU is still maintained in the halt state. When the voltage potential of point A falls to a point $A_2$ during the discharge of capacitor A, this voltage potential will be recognized as "L". Therefore, the CPU will again begin its operation at this time T4 shown in FIG. 3C. As can be understood from the above discussion, the CPU will undergo these repeated duty cycles.

As described above, according to the embodiment of the present invention, the CPU is operated only for the period of time of approximately 500 microseconds necessary for detecting the temperature, and after that the CPU stays in its halt state for a predetermined period of time such as e.g. 3 minutes by means of the C-R timer. As a result, the power consumption of the control apparatus including the CPU by the above-described construction and its operating method is low, so that battery life which was formerly only some tens of days is extended to some months or a year or longer. Thus, excellent energy saying is obtained. The extended battery life avoids troublesome battery replacements, providing convenience in use. Additionally, it is possible to reduce the battery size and numbers in the wireless type remote control apparatus, and to make the apparatus more compact.

Various modifications will become apparent for those skilled in the art having the benefit of the teachings of the present disclosure without departing from the scope thereof. Therefor, the claims should be constructed to include such modification.

What is claimed is:

1. A wireless type control apparatus for controlling a heating or cooling apparatus comprising:
   temperature sensing means for producing a signal indicating a temperature;
   computer means for receiving said temperature signal and for producing a control signal in response to said temperature signal during an operation period, and entering a halt period at times other than said operation period and for producing a command signal which is at a first level when the computer means is in said operation period and at a second level when in said halt period, said computer means entering said halt period upon receiving a halt signal at a halt signal input terminal thereof;
   transmitting means for transmitting said control signal to said heating or cooling apparatus; and
   an R-C timer, comprising a resistor and a capacitor, for controlling when said computer means is to be in one of said operation and halt periods, said R-C timer coupled to said computer means to receive said command signal, and to begin a charging sequence when said command signal is at said first level, said R-C timer having its output coupled to said halt signal input terminal of said computer means as said halt signal, said halt signal produced to halt said computer means after a voltage buildup on the capacitor C of said R-C timer reaches a predetermined level, said computer means then causing said command signal to be output at said second level which allows said R-C timer to discharge, so that said halt signal is removed from the halt signal input terminal after a predetermined time.

2. A wireless type control apparatus according to claim 1, wherein said temperature sensing means includes comparison signal producing means for producing a comparison signal representative of a desired temperature in response to an output of said computer means, and means for comparing said comparison signal from said producing means with said temperature signal.

3. A wireless type control apparatus according to claim 2 in which said comparing means includes an A-D converter, said A-D converter receiving said comparison signal and said temperature signal and producing a digital output indicative of a comparison therebetween.

4. A method of operation of a wireless type control apparatus including a temperature sensing means, a microcomputer having a CPU, a transmitting means, and a timer means having a C-R timer, comprising the steps of:

sensing a temperature and producing a temperature signal corresponding to the sensed temperature;

producing a control signal from the CPU in response to said temperature signal;

transmitting the control signal from the transmitting means to an apparatus to be controlled in response to a transmit command from said CPU;

producing a given signal from the CPU when one of said producing and transmitting cycles is completed;

charging the C-R timer in response to the given signal;

producing a signal from the CPU and causing the CPU to enter a halt state when a voltage of the C-R timer has reached a prescribed potential;

allowing the voltage of the C-R timer to discharge; and shifting from the halt state of the CPU to an operation state when the discharged voltage of the C-R timer has fallen to a predetermined potential.

5. A method as in claim 4, further including the step of producing a comparison signal representative of a desired temperature based on an output from the CPU, and comparing the sensed temperature signal with the comparison signal.

* * * * *